United States Patent [19]
Dietrich

[11] 3,799,079
[45] Mar. 26, 1974

[54] APPLICATOR FOR DEPOSITING ANHYDROUS AMMONIA UNDERGROUND

[75] Inventor: William J. Dietrich, Congerville, Ill.

[73] Assignee: Dietrich Manufacturing, Inc., Goodfield, Ill.

[22] Filed: July 10, 1972

[21] Appl. No.: 269,955

[52] U.S. Cl................... 111/7, 172/145, 172/710
[51] Int. Cl............................................ A01c 23/00
[58] Field of Search............. 111/6, 7, 85; 172/710, 172/180, 181, 145

[56] References Cited
UNITED STATES PATENTS

| | | | |
|---|---|---|---|
| 2,988,025 | 6/1961 | Johnston | 111/6 |
| 3,237,577 | 1/1966 | Wilkins | 111/7 |
| 3,292,562 | 12/1966 | Clark | 111/7 |
| 2,849,969 | 9/1958 | Taylor | 111/7 |
| 3,314,487 | 4/1967 | Kopaska | 172/710 |
| 3,504,646 | 4/1970 | Trahms | 111/7 |

Primary Examiner—Stephen C. Pellegrino

[57] ABSTRACT

The applicator includes a coulter, applicator knife and packer wheel mounted in trailing relation to a frame which in turn is spring-mounted to a tool bar drawn by a tractor. The frame facilitates removal of the coulter or applicator knife for maintenance or replacement while maintaining the knife in a position directly behind the coulter. The frame further permits vertical adjustment of the applicator knife relative to the coulter; and means are employed for lateral adjustment of the knife to maintain it directly behind the coulter during operation.

7 Claims, 3 Drawing Figures

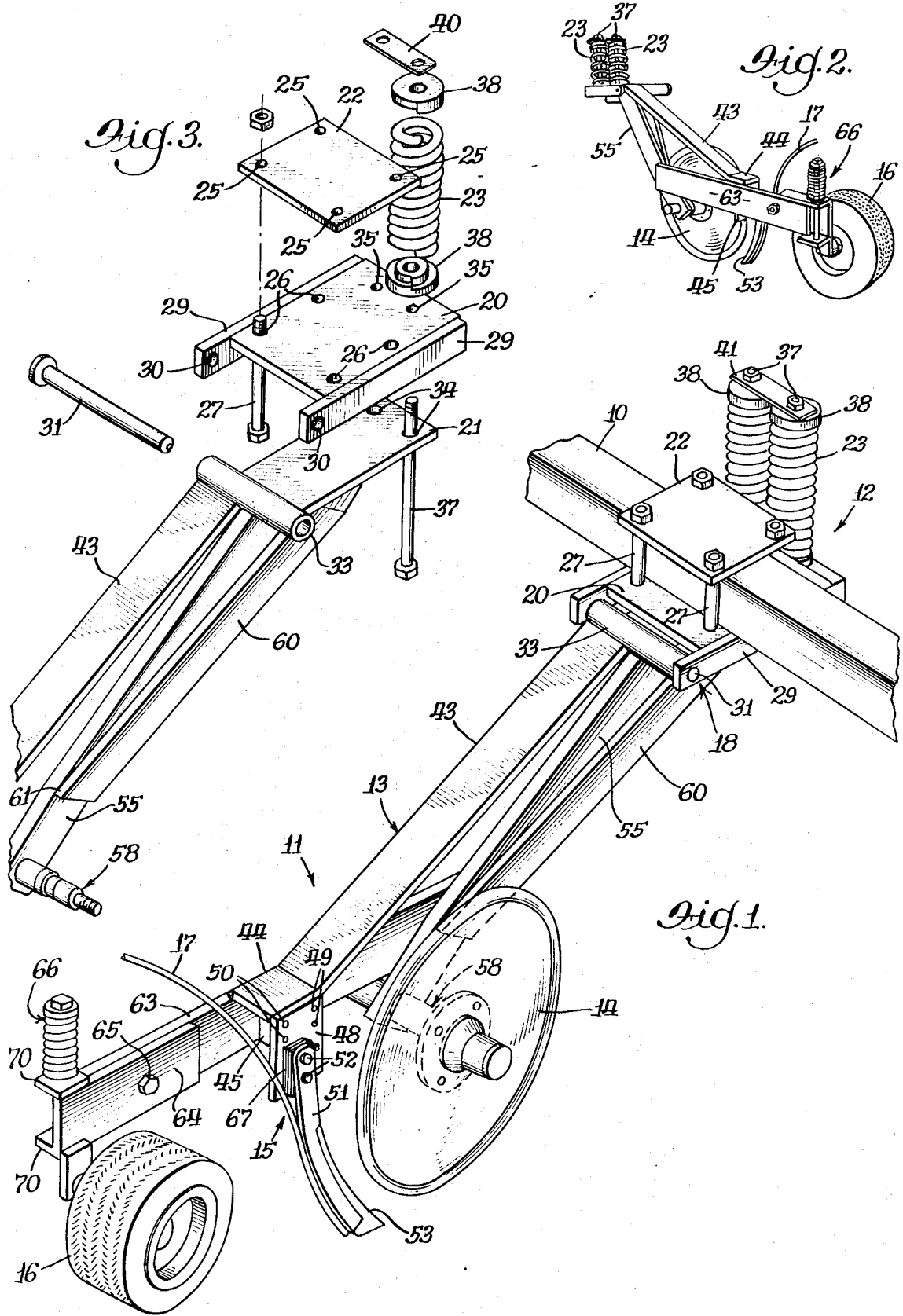

APPLICATOR FOR DEPOSITING ANHYDROUS AMMONIA UNDERGROUND

BACKGROUND AND SUMMARY

The present invention relates to farm implements of the type which are designed to be pulled by a tractor; and more particularly, it relates to an applicator for depositing anhydrous ammonia beneath the ground. These applicators are particularly useful in fertilizing lawns and pastures by depositing te fertilizer beneath the grass or turf. Normally, such applicators are designed so that a plurality of applicators may be mounted side by side or "ganged" on a tool bar which is pulled by the tractor and extends transversely of the direction of travel of the tractor. A tank of anhydrous ammonia carried by a caddy is also pulled by the tool bar, and it feeds the liquid fertilizer to each of the applicator knives.

With the applicator assemblies currently being employed, I have found that there are a number of operational problems which my present invention overcomes. Among these problems is the difficulty of removing the applicator knife or rolling coulter from the assembly for repair or replacement. Heretofore, this has been a time-consuming task.

Another problem with prior systems that use both a coulter and an applicator knife behind the coulter is that after a period of use, the knife becomes misaligned with the coulter, thereby applying additional stresses to the knife which it was not intended to meet. I have found that one of the main sources of this problem is the strain induced on the frame of the assembly during turning, and to overcome this problem I provide a flat steel bar which extends from the tool bar mount rearwardly and downwardly to the location at which the knife is secured to the frame. The width of this antideflection member extends laterally and provides resistance against lateral deflection, thereby maintaining the alignment between the coulter and the applicator knife. Further, means are provided for adjusting the lateral position of the knife relative to the coulter to insure alignment of the two. Both the coulter and the knife are removable from one side of the frame of the assembly, thereby facilitating adjustments in alignment of the two, as well as repair and replacement.

The applicator knife is mounted to a vertical plate welded to the main frame of the assembly which is provided with a plurality of apertures, spaced vertically as well as fore-and-aft relative to each other so that the mounting of the applicator knife may be adjusted upwardly (as the coulter wears) or closer to the coulter if too much trash is accumulated on the knife. Shims inserted between this vertical mounting plate and the main body of the knife provide the lateral adjustment relative to the coulter to provide an accurate initial alignment between the two. A packer wheel follows the knife for packing dirt over the slit cut by the coulter after the fertilizer is deposited in it by the applicator knife.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is an upper rear perspective of an applicator assembly constructed according to the present invention;

FIG. 2 is a reduced rear perspective of the apparatus of FIG. 1 taken from the other side; and FIG. 3 is a fragmentary view, similar to FIG. 1, with the parts connecting the frame to a tool bar shown in exploded relation.

DETAILED DESCRIPTION

Referring then to the drawing, reference numeral 10 designates a tool bar which is drawn behind a tractor in a conventional manner, the direction of elongation of the tool bar being transverse of the direction of travel of the tractor. The tool bar 10 in the illustrated embodiment has a generally square cross section.

An applicator assembly for depositing anhydrous ammonia underground is generally designated by reference numeral 11, and it trails behind and is connected to the tool bar 10 by means of a resilient mounting assembly generally designated by reference numeral 12. The main elements of the applicator 11 are a frame generally designated 13, a rolling coulter 14, an applicator knife assembly generally designated 15, and a trailing packer wheel 16. The coulter 14 cuts a slit in the turf or pasture, and the applicator knife trails the coulter, widening the slit for depositing anhydrous ammonia communicated to the bottom of the widened slit by means of a conduit 17. After the ammonia or liquid fertilizer is deposited in the slit, the packer wheel 16 is pulled over the slit to re-fill it with loose soil and compress the soil to retain the fertilizer and re-pack the turf.

The resilient mounting 12 includes a horizontal hinge, generally designated by reference numeral 18 which, in combination with springs in the mount permit the coulter 14 to roll over rocks, stumps, or other obstructions during operation; and normally, a plurality of applicators are connected side-by-side to a common tool bar. Hence, each of the applicators acts independently relative to obstructions encountered, but all are fed by a common source of ammonia which may be pulled on a separate caddy located behind the ganged applicators.

Referring now in particular to FIGS. 1 and 3, the spring mount 12 includes an apertured base plate 20, a hinge plate 21, and a top plate 22, as well as first and second coil springs 23. The top plate 22 rests on the top side of the tool bar 10, and the base plate 20 fits beneath it. The top plate 22 is provided with four corner apertures 25, and the base plate 20 is provided with corresponding apertures designated 26 for receiving bolts 27 in securing the two plates rigidly to the tool bar 10.

First and second bar members 29 are welded respectively to the sides of the base plate 20, and extend beyond the rear of it where they are provided with apertures 30 for receiving a shaft or pin 31 which also is received through a sleeve 33 welded to the rear of the hinge plate 21.

A pair of apertures 34 are provided at the forward end of the hinge plate 21, and apertures 35 are formed in the base plate 20 in register with the apertures 34 in the hinge plate 21 when the hinge plate is assembled as shown in FIG. 1. A pair of elongated bolts 37 extend upwardly through associated pairs of the apertures 34, 35 and through associated ones of the coil springs 23, only one of the bolts 37 being illustrated in FIG. 3. Lock washers 38 are provided above and below the coil springs 23, and an anchor plate 40 secures the upper end of the bolts 37 to the springs 23 by means of nuts 41. Thus, should the coulter 14 encounter an obstruction, the hinge plate 21 rotates clockwise (when viewed from the right) about the shaft 31 and sleeve 33, thereby compressing the coil springs 23 which then exert a biasing force tending to urge the coulter back to its normal position after passing over the obstruction.

Because the knife 51 is further from the hinge 31 when the coulter 14 encounters and obstruction, the knife 51 will raise higher than the coulter 14. Thus, if soil conditions require running the knife 51 lower than the bottom of the coulter 14, the knife 51 will raise high enough to avoid striking the obstruction.

Turning now to the frame 13, which includes the hinge plate 21 as well as the sleeve 33, it is fabricated mainly from flat steel stock; and it includes a flat, rigid member 43 welded at its upper forward end to the sleeve 33 and extending rearwardly and downwardly where it is welded to the forward end of a horizontal plate member 44 and the upper end of a transverse vertical plate member, a portion of which is seen at 45. The width of the frame member 43 extends in a lateral direction, and its main function is to add lateral rigidity to the frame so that under use conditions, for example, when the applicator is turning, there will be no lateral deflection between the coulter 14 and the applicator knife, and the applicator knife will follow along in the slit initiated by the coulter. In other words, the width of the frame member 43 extends in a lateral direction to add rigidity to the frame and resistance against longitudinal bending or deflection of the frame.

A mounting plate 48 extends in a vertical plane parallel to the direction of travel of the applicator, and it is welded to the outboard sides of the plates 44, 45. The mounting plate 48 is provided with a forward set of apertures 49 and a rear set of apertures 50. Among each of the sets 49, 50 are vertically spaced apertures adapted for mounting a knife element 51 by means of a pair of bolts 52. Thus, the knife element 51 may be adjusted upwardly or downwardly as well as in a fore-and-aft direction relative to the coulter 14. For example, it may be desirable to move the knife element 51 upwardly as the coulter wears, or forwardly to reduce the collection of debris on the knife element 51, in certain applications. The flexible conduit 17 for the liquid fertilizer is connected to the rear of the knife element 51, and the knife element 51 has a sharpened leading edge 53 trailing behind the coulter 14.

Returning now to the frame 13, a second frame member 55 is welded at its upper end to the bottom of hinge plate 21, and it extends downwardly beneath the anti-deflection member 43 and is fitted at its lower end with a stub shaft 58 on which the coulter 14 is rotatably mounted. The stub shaft 58 is considered an important element in the present invention because it permits mounting of the coulter and removal of it from one side of the frame, without obstruction on the outboard end.

The frame member 55 is braced by a member 60 which is located at the side thereof and welded at its bottom edge as at 61 in FIG. 3 to the member 55 and at its upper edge to its bottom surface of the hinge plate 21.

A longitudinally extending, horizontal frame member 63 is welded at its forward end (see FIG. 2) to the frame member 55 and at an intermediate location to the plates 44, 45. The member 63 extends rearwardly beyond its welding to the plates 44, 45 to provide a mounting for the Packer wheel 16. The packer wheel 16 is rotatably mounted on a shaft which is rigidly secured to a plate 64 which is pivotally mounted by means of a bolt 65 to the rear extension of the frame member 63, and a coil spring assembly 66 interconnects the tail end of the member 63 and the tail end of the plate 64 to provide a spring mounting for the packer wheel 16.

One or more shims, designated 67 in FIG. 1 may be interposed between the outer surface of the mounting plate 48 and the knife element 51 to permit lateral adjustment of the knife plate 51 relative to the coulter 14 to insure that the applicator knife follows in the slit cut by the coulter.

The present invention, then, is designed to operate in a pasture or the like which may have sod on it. The coulter 14 cuts a slit in the sod to a predetermined depth, although this depth is not critical. The knife element 51 follows in the slit cut by the coulter 14, and this slit is somewhat widened by the thickness of the knife element 51. The leading edge 53 of the knife element 51 facilitates widening of the slit. The liquid fertilizer is communicated through the conduit 17 to the heel of the knife element 51 where it is deposited at the base of the slit thus formed. The knife element 51 may be adjusted vertically or in a fore-and-aft direction by means of the sets of apertures 49, 50; or it may be adjusted laterally by means of the shims 67. The packer wheel 16 then follows the applicator knife 15 and packs the loosened dirt to trap the fertilizer beneath the ground. In the event that an obstruction is encountered, the coulter 14 pivots about the shaft 31 as does the entire frame 13 and hinge plate 21, thereby lifting the knife element 51 upwardly and out of engagement with the obstruction. The packer wheel 16 will also be lifted out of the way in the event that a stump or other large object protruding out of the ground is encountered, although a small vertical displacement is permitted between the rear of the frame element 63 and the plate 64 on which the packer wheel 16 is carried. Stop elements designated 70 are provided to limit this relative motion about the pivot 65.

To summarize the features of the present invention, the knife element 51 is adjustable vertically, laterally and fore and aft relative to the coulter 14. Secondly, the frame is rigid and resists any bending between the coulter 14 and the knife element 51 so that once the knife element is properly located behind the coulter, it will follow in the slit cut thereby even under the rugged conditions encountered in use. In addition, the resilient mounting means 12 permits the frame to be lifted upwardly when an obstruction is encountered by the coulter 14 by pivoting the frame and hinge plate about the shaft 31 which is located to the rear of the tool bar 10 and at a location well above the axis of rotation (namely the stub shaft 58) of the coulter 14. The stub shaft 58 permits easy replacement or removal of the coulter 14.

Having thus described in detail a preferred embodiment of my invention, persons skilled in the art will be able to modify certain of the structure which has been illustrated or to substitute equivalent elements for those disclosed while continuing to practice the principal of the invention; and it is, therefore, intended that all such modifications and substitutions be covered as they are embraced within the spirit and scope of the appended claims.

I claim:

1. An attachment for applying liquid fertilizer underground and adapted to be attached to a tool bar drawn by a tractor comprising: a frame having a forward and a rear end and including an anti-deflection member extending from the forward end of said frame downwardly to an intermediate part thereof; a coulter rotatably mounted to one side of said frame adjacent said intermediate part; an applicator knife means secured to said frame directly behind said coulter; spring mounting means connecting said frame to said tool bar for permitting said coulter and frame to rotate about an axis located behind said tool bar and above the axis of rotation of said coulter; said spring mounting means comprising rigid mounting means for rigidly attaching to said transverse tool bar, a hinge plate beneath said rigid attachment, a sleeve rigidly secured to the rear end of said hinge plate, a pin pivotally connecting said sleeve to said rigid mounting means, said anti-deflection member including a flat steel member with its width extending laterally in the direction of travel of said coulter and welded at its upper forward end to said sleeve, said member extending rearwardly and downwardly therefrom to said intermediate part of said frame; and a packer wheel assembly mounted to the tail end of said frame behind said applicator knife means.

2. The system of claim 1 further comprising a stub shaft secured to same frame and extending to one side thereof for rotatably mounting said coulter at said intermediate location below and to the rear of the pivotal connection to a tool bar.

3. The apparatus of claim 1 further comprising a vertical mounting plate at the intermediate location of said frame for mounting said applicator knife, said mounting plate including a forward and a rear set of vertically spaced apertures for receiving a bolt and attaching said applicator knife thereto, whereby said applicator knife may be adjusted vertically or fore-and-aft relative to said coulter.

4. The apparatus of claim 3 further comprising means for adjusting the lateral position of said applicator knife so that it may always be located directly behind said coulter and follow in the slit initiated thereby.

5. Apparatus for applying liquid fertilizer underground and adapted to be attached to the tool bar of a tractor comprising: a frame including first anti-deflection means comprising a steel bar elongated in the direction of travel of said tractor and having its width extending laterally of the intended direction of travel of said tractor when said frame is attached thereto; a stub shaft welded to said frame and extending laterally to one side thereof; a coulter rotatably and removably mounted to said stub shaft; an applicator knife means mounted to said frame adjacent the rear end of said first anti-deflection means and behind said coulter; means for laterally adjusting the location of said applicator knife means relative to said coulter; spring mounting means for hingedly connecting said frame to said tool bar and including a hinge plate beneath said tool bar and mounted for pivotal movement about a horizontal axis behind said tool bar; said frame further comprising second anti-deflection means including a brace extending from said hinge plate to a location on said frame adjacent said stub shaft to resist deflection of said frame by said coulter during operation; and a packer wheel mounted to said frame behind said applicator knife means.

6. THe apparatus of claim 5 wherein said means for laterally adjusting the location of said applicator knife comprises shim means interposed between said frame and said knife.

7. The apparatus of claim 5 wherein said applicator knife means comprises a knife element with a conduit attached rearwardly thereto for depositing liquid fertilizer to the opening made by said coulter and said knife element.

* * * * *